UNITED STATES PATENT OFFICE.

JOHN STUART PEARCE, OF VANCOUVER, BRITISH COLUMBIA, CANADA.

WOOD DISTILLATION.

1,395,867. Specification of Letters Patent. Patented Nov. 1, 1921.

No Drawing. Application filed May 4, 1920. Serial No. 378,842.

*To all whom it may concern:*

Be it known that I, JOHN STUART PEARCE, a citizen of Canada, residing at Vancouver, in the Province of British Columbia, Canada, have invented new and useful Improvements in Wood Distillation, of which the following is a specification.

This invention relates to a process of making charcoal and has for its object the manufacture of a product of a distinctly higher grade than heretofore met with, and possessing differences in physical condition of so marked and important a nature as to constitute a new variety of charcoal. It also covers a new and valuable process of manufacturing which makes it possible to use green undried wood as a starting point and, without any preliminary treatment, reducing the same to charcoal in a very short time.

With these and other objects in view, the invention consists in the novel steps and combination of steps constituting the process and in, the new product all as will be more fully hereinafter disclosed and particularly pointed out in the claims.

As an example of my invention, green slabs of convenient size and a thickness of perhaps four inches or less are subjected without any preliminary drying to the action of non-combustible gases reaching the wood at a temperature of perhaps 1200° F. This temperature may be very greatly exceeded especially if the furnace is lined with fire-brick; or it may be reduced. The great consideration is that in the employment of a gaseous heating medium you have an enveloping gas that will uniformly heat the wood to a desired temperature, and that will subject it to any required temperature at any stage of the process. With a medium sized furnace it has been found possible to convert green slabs to high grade tough compact charcoal in eight hours. With a fire-brick-lined furnace this period may be reduced without sacrificing the quality in any way.

Speaking in general, the time of treatment varies inversely as the temperature of the heating gases and their volume, and directly as to the weight of the charge.

The superheated oxygen free decomposing gases are obtained by passing products of combustion over incandescent refractory material, as more fully described in my co-pending application, Serial No. 286,549 filed March 31st, 1919.

There are two methods of carrying out my process, both giving as an end product a tough, compact, non-crumbling charcoal. The simplest way is to rush the reaction to a completion without reducing the heat at any stage of the process. The other way consists in applying a very high temperature to the green wood as soon as the operation begins and maintaining the same till the temperature of the mass is such as to allow the exothermic reaction to get under way. The temperature is then controlled by restricting the flow of heated decomposing gases till all the volatile products of distillation are removed. The temperature is again raised to a maximum and continued till the process is complete.

When it is desired to recover as much of the by-products as possible, the slowing down of the process in the middle of the operation is absolutely essential. The treatment consists in shutting off the flow of heated gases as soon as the exothermic reaction becomes general throughout the mass, and allowing the wood alcohol, acetic acid, acetone, etc., to distil off under the most favorable conditions.

It has been stated that the exothermic reaction begins at 270° C. In another method of subdivision it is stated that the expulsion of water takes place between 150–280° C. Then from 280 to 350° C. gaseous products result. From 350–430° C. liquid and solid hydrocarbons are given off, and after this charcoal remains.

I am aware that small experiments have been made in which high temperatures have been employed, only in these cases the reaction was carried out in highly heated closed or open containers and the heat was necessarily applied at the bottom. This is entirely different from the method I employ in which the heating gases entirely envelop the wood, and are constantly being reinforced and replaced by fresh highly heated gases.

It is very remarkable the peculiar effect this method of heating by gaseous envelopment has upon the structure of the resulting charcoal. The actual changes that take place when wood is changed to charcoal are not clear, but it would appear that in the transformation the mass takes on a kind of local plasticity otherwise the carbon particles would not be cemented together. Now I have discovered that the contact of moving highly heated gases upon the surface of the wood has the effect of very firmly cementing the carbon particles together and producing a charcoal of a firmness and toughness previously unknown. This charcoal is of the greatest possible value in the metallurgy of iron, steel, brass, etc.

Although it is generally recognized that the exact reactions taking place in the destructive distillation of wood are little understood, it has always been granted that the methods employed determined to a greater or less extent, the nature of the resulting charcoal. In view of these facts, I have endeavored to find the conditions best suited to obtain a firm charcoal for metallurgical purposes. I have discovered that a flexible easily controlled heating medium is essential and one whose temperature may be raised or lowered at will. These conditions are not met with or possible in a retort, or in heap burning, but by employing oxygen-free gaseous products of combustion and superheating them by contact with incandescent refractory material, I have overcome the difficulty. Not only am I enabled to vary the temperature of the gases, but I may also attain the same end by controlling their flow.

It is well known that in changing materials from a plastic to a solid brittle state, the speed with which the change is brought about has a decided effect upon the physical condition of the resulting product. I have found that the formation of charcoal is no exception to the rule, and that by quickly at the proper moment enveloping the material in highly heated gases, I can obtain the desired results.

It is obvious that those skilled in the art may vary the details of the process without, in any way departing from the spirit of the invention. Therefore, I do not wish to be limited to the above disclosures except as may be required by the claims.

I claim:—

1. A process of producing a compact tough charcoal which comprises leading highly heated non-combustible gases over a mass of green undried wood until the whole mass reaches a temperature of about 280° C.; then reducing the flow of heated gases until the mass attains a temperature of about 430° C.; and then finishing the product at a higher temperature than previously employed; substantially as described.

2. As a new product a tough, compact, non-crumbling variety of charcoal whose surfaces are of uniform consistency, existing in a semi-vitrified condition with surface strains uniformly distributed; substantially as described.

JOHN STUART PEARCE.